(12) United States Patent
Kawamura et al.

(10) Patent No.: US 8,404,992 B2
(45) Date of Patent: Mar. 26, 2013

(54) METHOD OF WELDING METALLIC GLASS WITH CRYSTALLINE METAL BY HIGH-ENERGY BEAM

(75) Inventors: Yoshihito Kawamura, Kumamoto (JP); Jonghyun Kim, Kumamoto (JP); Hironori Kuroki, Fukuoka (JP); Yuji Yanagida, Fukuoka (JP); Naohisa Sawai, Fukuoka (JP)

(73) Assignees: Kumamoto University, Kumamoto (JP); Kuroki Kogyosho Co., Ltd, Fukuoka (JP)

( * ) Notice: Subject to any disclaimer, the term of this patent is extended or adjusted under 35 U.S.C. 154(b) by 376 days.

(21) Appl. No.: 12/670,125

(22) PCT Filed: Jul. 25, 2008

(86) PCT No.: PCT/JP2008/063446
§ 371 (c)(1),
(2), (4) Date: Jun. 25, 2010

(87) PCT Pub. No.: WO2009/014221
PCT Pub. Date: Jan. 29, 2009

(65) Prior Publication Data
US 2010/0275655 A1 Nov. 4, 2010

(30) Foreign Application Priority Data
Jul. 25, 2007 (JP) ................................. 2007-193757

(51) Int. Cl.
B23K 26/32 (2006.01)
B23K 15/00 (2006.01)
B23K 26/20 (2006.01)

(52) U.S. Cl. ............................... 219/121.14; 219/121.64

(58) Field of Classification Search ............. 219/121.13, 219/121.14, 121.63, 121.64, 121.31, 121.32, 219/121.82; 228/262.1; 148/561
See application file for complete search history.

(56) References Cited

U.S. PATENT DOCUMENTS 4,223,199 A * 9/1980 Steigerwald et al. .... 219/121.35
4,360,733 A * 11/1982 Novak et al. .............. 250/361 R
7,947,134 B2 * 5/2011 Lohwongwatana et al. .. 148/522

FOREIGN PATENT DOCUMENTS
JP 59037860 A * 3/1984
(Continued)

OTHER PUBLICATIONS
Yoshihito Kawamura et al., Electron Beam Welding of Zr-Based Bulk Metallic Glass to Crystalline Zr Metal, The Japan Institute of Metals, Materials Transactions, 2001, pp. 2649 to 2651, vol. 42, No. 12.
(Continued)

*Primary Examiner* — Samuel M Heinrich
(74) *Attorney, Agent, or Firm* — Martin Fleit; Paul D. Bianco; Fleit Gibbons Gutman Bongini Bianco PL

(57) ABSTRACT

To provide a method of welding a metallic glass and a crystalline metal by shifting a high-energy beam scan area from a butting face thereof to the metallic glass side, to fall within a composition range required for glass phase formation of a metallic glass base material in a simplified assured manner. In a welding method for weldingly joining a metallic glass and a crystalline metal together by scanning a high-energy beam in a position shifted from a butt interface between the metallic glass and the crystalline metal toward the metallic glass, it is intended to provide a technique for allowing a composition of a melt zone formed around a welding interface to fall within a composition range required for forming a glass phase in the metallic glass to be joined, in a simple and more reliable manner. A metallic glass (1) and a crystalline metal (2) are butted against each other to define a groove space (Y) over a groove formed on the side of the crystalline metal (2). Then, electron beam welding is performed in a position shifted from the butt interface toward the metallic glass (1) to form a melt zone (4) which has a composition for forming an amorphous metallic glass, and comprises a top fused sub-region (41) and a lower fused sub-region (42), wherein the top fused sub-region has a relatively wide area including the groove space (Y) defined adjacent to an upper end of the butt interface and on the side of the crystalline metal, and the lower fused sub-region extends from the top fused sub-region to reach bottom surfaces of the metallic glass and the crystalline metal, while being narrowingly tapered in a downward direction.

19 Claims, 6 Drawing Sheets

FOREIGN PATENT DOCUMENTS

| | | |
|---|---|---|
| JP | 59101287 A | 6/1984 |
| JP | 2003325710 A | 11/2003 |
| JP | 2004066294 A | 3/2004 |
| JP | 2005246433 A | 9/2005 |
| JP | 2006088201 A | 4/2006 |

OTHER PUBLICATIONS

International Search Report published Jan. 29, 2009 for PCT/JP2008/063446 filed Jul. 25, 2008.

English translation of International Preliminary Report on Patentability published Feb. 9, 2010 for PCT/JP2008/063446 filed Jul. 25, 2008.

English translation of Written Opinion of the International Searching Authority published Feb. 3, 2010 for PCT/JP2008/063446 filed Jul. 25, 2008.

\* cited by examiner

METHOD OF WELDING METALLIC GLASS WITH CRYSTALLINE METAL BY HIGH-ENERGY BEAM

TECHNICAL FIELD

The present invention relates to a method for welding an amorphous metal or a composite metal of having a crystalline phase and an amorphous phase (hereinafter referred to collectively as "metallic glass") and a metal having a typical crystal structure (hereinafter referred to as "crystalline metal"), by scanning of a high-energy beam such as an electron beam or a laser beam.

BACKGROUND ART

A metallic glass is excellent in such properties as strength, hardness, wear resistance and corrosion resistance. Therefore, it is expected to be used in various fields.

However, despite having such excellent properties, the metallic glass has disadvantages such as poor workability and poor weldability. Thus, in order to expanding the field of application of a metallic glass, it is important to establish a technique of welding between two metallic glasses. Furthermore, in view of fabricating an actual device component or the like, it is also necessary to establish a technique of joining between a metallic glass and a practical crystalline metallic material. In this connection, there have been reported research results in which an explosion bonding method, a friction welding method, or a fusion welding method, is employed as joining means therefor.

However, in cases where a welding method designed to melt a joining region is employed, a metallic glass and a crystalline metal are melt-mixed together in a melt region formed on a butt interface therebetween to cause deterioration in glass-forming ability. And thus, consequently, a brittle intermetallic compound is caused to form, which makes it impossible to obtain a joined body having sufficient weld strength.

Considering the above problem, there has been reported a research result in which a welding method is employed which is designed to scan a high-energy beam, such as an electron beam or a laser beam, over a butt interface between a metallic glass and a crystalline metal, wherein the high-energy beam used as a heating source for welding is capable of forming a sharp penetration shape and suitable for local rapid heating and cooling, so that rapid heating and rapid cooling can be achieved while suppressing melt-mixing of two butted members in a welding region, as disclosed in the following Non-Patent Document 1

The report also discloses that an adequacy of welding between a metallic glass and a crystalline metal depends on whether a composition of a melt zone formed around an interface therebetween falls within a composition range which allows a TTT (Time/Temperature/Transformation) curve for crystallization of the melt zone to be set on a long-time side relative to a cooling curve during the high-energy beam welding.

The inventors of this application previously proposed a welding method designed to scan a high-energy beam in a position shifted from a butt interface between a metallic glass and a crystalline metal toward the metallic glass, so as to allow a component composition of a melt zone formed around the butt interface during welding to have a glass-forming ability, as disclosed in the following Patent Document 1.

This method is intended to shift the scanning position of the high-energy beam from the butt interface between the metallic glass and the crystalline metal toward the metallic glass in such a manner that an amount of fused metallic glass becomes greater than that of fused crystalline metal in the melt zone to allow a component composition of the melt zone to fall within a range of composition ratios having a glass-forming ability.

Non-Patent Document 1: Materials Transactions, Vol. 42, No. 12 (2001), pp. 2649-2651

Patent Document 1: JP 2006-88201A

DISCLOSURE OF THE INVENTION

[Problem to be Solved by the Invention]

The above method for welding between a metallic glass and a crystalline metal teaches to shift a scanning position of a high-energy beam from a butt interface between the metallic glass and the crystalline metal toward the metallic glass. However, an optimal shift amount for efficiently obtaining a high-quality joined state while preventing crystalline metal components from being contained in the melt zone and minimizing an amount of fused metallic glass varies depending on materials or sizes of the metallic glass and the crystalline metal, or welding conditions. Thus, it is extremely difficult to determine the optimal shift amount.

Moreover, in cases where the beam scanning position is shifted toward the metallic glass to achieve both advantages of strongly joining the metallic glass and the crystalline metal together, and maintaining a glass-forming ability in the melt zone, there is a problem that such advantages cannot be achieved without imposing restrictions on materials or sizes of the metallic glass and the crystalline metal, or welding conditions.

The problem to be resolved of the present invention is to provide a method for obtaining strong welded strength without deterioration in glass-forming ability in the melted zone formed on a welding interface, in a simple manner, in a method for welding a metallic glass and a crystalline metal by scanning a high-energy beam in a position shifted from a butt interface between the metallic glass and the crystalline metal toward the metallic glass side.

[Means for Solving the Problem]

The present invention resolved the above problem by defining a groove space adjacent to an upper end of the butt interface only of the side of the crystalline metal, in a method for welding a metallic glass and a crystalline metal by scanning a high-energy beam along a line shifted from a butt interface between the metallic glass and the crystalline metal toward the metallic glass, A shift amount of the scanning beam toward the metallic metal side, as a premise of the present invention, is set in a manner as disclosed in the Patent Document 1, specifically, as such that a scanning position is displaced from the butt interface toward the metallic glass side, to allow a composition of a melt zone to fall within a composition range having a glass-forming ability, where a time at a nose of a TTT curve for crystallization of a melt zone becomes greater than 2.0 seconds.

Preferably, in the present invention, the groove space defined adjacent to the upper end of the butt interface and only on the side of the crystalline metal, is set based along a shape of a melting isotherm of the crystalline metal during the scanning of the irradiation beam.

In accordance with the present invention, a groove space is defined adjacent to the upper end of the butt interface and only on the side of the crystalline metal, and a high-energy beam is scanned in a position shifted from the butt interface between the metallic glass and the crystalline metal toward the metallic glass, to form a melt zone in the metallic glass. Thus, an amount of the crystalline metal to be melt-mixed in the melt zone becomes negligibly small, which makes it possible to prevent a composition of the melt zone from deviating from a composition range having a glass-forming ability.

Alternatively, the butted face may be inclined to the direction of the high energy beam applied singly or together with forming the groove space on the top only at the side of the crystalline metal of the butt face. In a case of welding by applying a commonly-used high-energy beam, crystallization is likely to occur in a heat-affected zone rather than in a melt zone. Further, as a thickness of a workpiece to be welded is increased, and a cooling rate becomes lower, crystallization is more easily to be occurred A metallic glass usable in the present invention may be the following type.

As basic conditions, the metallic glass is required to have a glass-forming ability which is free of causing crystallization in a heat-affected region during high-energy beam welding. Specifically, the metallic glass is required to have a glass-forming ability with a characteristic where a TTT curve for crystallization during heating from its solid state does not intersect with a heating/cooling curve during the welding. A heating/cooling rate during the welding becomes lower as a thickness of a target workpiece is increased. For example, in a target workpiece having a thickness of 2 mm, the welding can be performed without causing crystallization in a heat-affected region as well as in a melt zone, if a time at a nose of a TTT curve for crystallization during heating from its solid state is 0.2 seconds or more. This value is equivalent to 5.0 seconds or more in a time at a nose of a TTT curve for crystallization during cooling from its liquid state.

(2) Further, in a glass-forming ability of a melt zone (a mixture of an original metallic glass and components of a crystalline metal), if a time at a nose of a TTT curve for crystallization during cooling from its liquid state is 0.2 seconds or more, the welding is facilitated. In other words, it is preferable that the TTT curve for crystallization of the melt zone during cooling from the liquid state is set on a long-time side relative to a cooling curve during the welding. A cooling rate during the welding becomes lower as a thickness of a target workpiece is increased. For example, in a target workpiece having a thickness of 2 mm, the welding is facilitated if the target workpiece has a glass-forming ability with a characteristic where a time at a nose of a TTT curve for crystallization during cooling from its liquid state is 0.2 seconds or more.

Further, as means to prevent melt down of the crystalline metal to the melt zone, means for inclining a metallic glass and a crystalline metal butted against each other, at an angle of about 5 degrees or more, to allow the metallic glass to be located at a higher position than the crystalline metal during the welding may be employed, instead of defining the groove space adjacent to the upper end of the butt interface and on the side of the crystalline metal. In this case, based on the inclination during the welding, mixing of the molten crystalline metal with the metallic glass through a butt interface can be suppressed.

[Effect of the Invention]

The present invention makes it possible to obtain a joined body consisting of a metallic glass and a crystalline metal, with sufficient joint strength, and promote relaxation of restrictions on welding conditions, an increase in size of a workpiece to be welded, and an increase in types of usable metallic glasses, and an increase in types of usable crystalline metals.

BEST MODE FOR CARRYING OUT THE INVENTION

In the present invention, a configuration of a groove space is determined in the following manner. A joining operation is performed using a metallic glass having a low glass-forming ability to obtain a melting isotherm of the metallic glass through observation of microstructure of an etched cross-section thereof, or microscopic photograph of an etched cross-section thereof. Then, based on the melting isotherm, an isotherm corresponding to a melting point of a crystalline material is obtained by calculation using thermophysical properties, such as melting point, specific heat and thermal conductivity, of each of the metallic glass and the crystalline material. Then, based on the isotherm, the crystalline material is fabricated to have a groove space with a simple configuration in such a manner that a region to be heated up to a temperature equal to or greater than the melting point thereof is not included in an obtained crystalline material.

Alternatively, a metallic glass and a certain crystalline metal is welded together under a condition that a welding position is shifted from a butt interface therebetween toward the metallic glass side by a given distance, for example 0.2 mm, a cross-section of the crystalline metal having a melt-down pattern is measured, and then based on the melt-down pattern of the cross-section, a configuration of a groove space to be defined adjacent to an upper end of the butt interface and on the side of the crystalline metal can be determined. Further, the configuration may be simplified to be approximated straight lines to provide industrial convenience.

EXAMPLE

FIG. 1 shows a welding method according to the present invention. In FIG. 1, a Zr-based metallic glass was used as a metallic glass 1, and each of Zr, Ti, Ni and SUS 316L was used as a crystalline metal 2. The metallic glass 1 and the crystalline metal 2 were butted against each other to define a groove space having a depth of 0.5 mm and a width of 0.5 mm, over a linearly-cut groove Y on the side of the crystalline metal 2. A welding operation was performed under conditions that a welding current and a welding speed are verified while keeping an acceleration voltage at a constant value of 60 kV, and a welding position is shifted from a butt interface 3 toward the metal glass 1.

FIG. 2 shows a state after a melt of the metallic glass 1 is filled in the space defined by the groove formed on the side of the crystalline metal. As shown in FIG. 2, a melt zone 4 was formed along the butt interface 3 to have a top fused sub-region 41 with a relatively wide area including the groove space adjacent to the upper end of the butt interface, and a lower fused sub-region 42 extending from the top fused sub-region 41 to reach bottom surfaces of the metallic glass and the crystalline metal, while being narrowingly tapered in a downward direction. Further, a depression was formed in a surface of a joined region. As measures for suppressing the formation of the depression in the surface, an additional metallic glass may be supplied to the groove space in such a manner that it is placed on the joined region, and melted by beam irradiation. Alternatively, a powdered or line-shaped metallic glass may be supplied to a beam irradiation position. Further, a preheating operation may be performed according to need.

Table 1 shows an evaluation result of an adequacy of a joined state in each of a conventional method and the present invention. The irradiation mode illustrated in Table 1 includes a mode A in which an irradiation position of a high-energy beam X is set at the butt interface between the metallic glass 1 and the crystalline metal 2, a mode B in which the irradiation position of the high-energy beam X is shifted from the butt interface toward the metallic glass, and a mode C in which the irradiation position of the high-energy beam X is shifted from the butt interface toward the metallic glass, and the groove space is defined adjacent to the upper end of the butt surface and only on the side of the crystalline metal, according to the present invention.

TABLE 1

| Irradiation Mode | Zr | Ti | Ni | SUS316L |
|---|---|---|---|---|
| A | ○ | x | x | x |
| B | ○ | ○ | Δ | x |
| C | ○ | ○ | □ | □ |

In Table 1, the joined state is shown by the symbols ○, □, Δ, x. The joined state ○ means that the joined region has an amorphous structure identical to that of the joined metallic glass, wherein a joint efficiency is 100% or more, and no fracture occurs in a bending test. The joined state □ means that a weld metal has an amorphous structure identical to that of the welded metallic glass, wherein the joint efficiency is 100% or more, and fracture occurs in the bending test. The joined state Δ means that a weld metal includes a metal compound and has a structure different from that of the joined metallic glass, wherein the joint efficiency is in the range of 50% to less than 100%. The joined state x means that a weld metal includes an intermetallic compound and has a structure different from that of the joined metallic glass, wherein the joint efficiency is less than 50%.

As seen in Table 1, in the case where the crystalline metal is made of Zr, a perfect joined state was exhibited in each of the high-energy beam irradiation modes. In the case where the crystalline metal made of Ti, as long as the irradiation position of the high-energy beam is shifted toward the metallic glass, the same structure as that of the metallic glass was formed irrespective of whether the groove space is provided on the side of the crystalline metal. However, in the case where the crystalline metal is made of Ni or SUS, stainless steel type 316L the same structure as that of the metallic glass could be formed only under the welding method of the present invention.

FIGS. 4 and 5 show results obtained by measuring a change in composition of a weld metal around a welded region of a metallic glass and stainless steel as a crystalline metal. In an inventive example illustrated in FIG. 4 where the beam irradiation position is shifted, and the groove space is provided, the weld metal had a composition of the metallic glass 1 in the entire melt zone extending from the top fused sub-region to the lower fused sub-region. Specifically, the weld metal was homogeneous with the metallic glass 1 without mixing of the crystalline metal 2, and has a composition capable of forming an amorphous metallic glass. In a comparative example illustrated in FIG. 5 where the beam irradiation position is shifted without providing the groove space, the top fused sub-region had a composition containing the crystalline metal mixed therein, and a crystallized area exhibiting brittleness was observed in the weld metal.

FIGS. 6 and 7 show results obtained by checking the presence or absence of crystallization in each portion of a joined body of the metallic glass and the stainless steel by micro area X-ray diffractometry. In each of FIGS. 6 and 7, the upper diagrams show a state of the joined body, wherein p, q, r and s indicate the stainless steel, the top fused sub-region, the lower fuses sub-region, and the metallic glass, respectively. Further, the lower graph showing the result of the micro area X-ray diffractometry corresponds to the upper diagrams. In the inventive example illustrated in FIG. 6 where the beam irradiation position is shifted, and the groove space is provided, the weld metal had a composition of the metallic glass 1 in the entire melt zone extending from the top fused sub-region to the lower fused sub-region. Specifically, the weld metal was homogeneous with the metallic glass 1 without occurrence of crystallization, and formed as an amorphous metallic glass. In the comparative example illustrated in FIG. 7 where the beam irradiation position is shifted without providing the groove space, the top fused sub-region had a composition containing the crystalline metal mixed therein, and a crystallized area exhibiting brittleness was observed in the weld metal.

Comprehensive Evaluation of Effects of the Present Invention in View of Examples Table 2 shows a comprehensive evaluation of each sample.
As seen in Table 2, the present invention can provide advantages of being able to obtain a joined body consisting of a metallic glass and a crystalline metal, with sufficient joint strength, and promote relaxation of restrictions on welding conditions, an increase in size of a workpiece to be welded, and an increase in types of usable metallic glasses, and an increase in types of usable crystalline metals.

FIG. 8 shows a level of influence of components of the crystalline metal on a change in glass-forming ability of the melt zone when each of the various crystalline metals is melt-mixed in the Zr-based metallic glass. As seen in FIG. 8, each of Ni and SUS having a melting point lower than those of Zr and Ti is liable to be melt-mixed in the Zr-based metallic glass. Particularly, SUS has a composition different from components of the metallic glass used in the above examples. This means that, even if a small amount of SUS is melt-mixed in the weld metal, it causes a significant deterioration in glass-forming ability.

FIG. 9 is a graph conceptually showing a relationship between a level of difficulty in welding and plate thickness, and a range allowing adequate welding by each of various welding methods, when each of the various crystalline metals is melt-mixed in the Zr-based metallic glass in a certain amount. As seen in FIG. 9, the present invention using a high-energy beam makes it possible to perform welding of SUS which has been unachievable by the conventional methods.

TABLE 2

| Plate Thickness (mm) | Size of Space (mm) | Scanning Position (mm) | Welding Heat Input (J/mm) | Metallic Glass | Crystalline Metal | Evaluation of Joining | Note | Bending Fracture Strength (MPa) |
|---|---|---|---|---|---|---|---|---|
| 2 | 0 | 0 | 18 | a | SUS | x | | 110 |
| 2 | 0 | 0.2 | 18 | a | SUS | Δ | A, C, E | 505 |
| 2 | 0 | 0.3 | 18 | a | SUS | x | | 23 |

TABLE 2-continued

| Plate Thickness (mm) | Size of Space (mm) | Scanning Position (mm) | Welding Heat Input (J/mm) | Metallic Glass | Crystalline Metal | Evaluation of Joining | Note | Bending Fracture Strength (MPa) |
|---|---|---|---|---|---|---|---|---|
| 2 | 0.4 | 0.2 | 18 | a | SUS | Δ | | 530 |
| 2 | 0.6 | 0.2 | 18 | a | SUS | □ | | 605 |
| 2 | 0.7 | 0.2 | 18 | a | SUS | □ | | 603 |
| 2 | 0.5 | 0.2 | 18 | a | SUS | □ | A, C, E | 713 |
| 2 | 0 | 0.2 | 18 | a | Ti | □ | B, C, D, E | 610 |
| 2 | 0 | 0.4 | 18 | a | Ti | ○ | | no fracture |
| 2 | 0 | 0 | 18 | a | Ti | × | | 201 |
| 2 | 0 | 0 | 18 | a | Ni | × | | 102 |
| 2 | 0 | 0.2 | 18 | a | Ni | Δ | A, C | 215 |
| 2 | 0.5 | 0.2 | 18 | a | Ni | □ | A, C, E | 420 |
| 2 | 0.5 | 0.2 | 12.1 | a | Ti | □ | B | 606 |
| 2 | 0.5 | 0.2 | 18 | a | Ti | ○ | C, D, E | no fracture |
| 3 | 0 | 0.2 | 22 | a | Ti | Δ | C | 365 |
| 3 | 0 | 0.2 | 22 | a | Ni | × | C | 96 |
| 3 | 0 | 0.2 | 22 | a | SUS | × | C | 243 |
| 3 | 0.5 | 0.2 | 22 | a | Ti | ○ | C | no fracture |
| 3 | 0.5 | 0.2 | 22 | a | Ni | Δ | C | 210 |
| 3 | 0.5 | 0.2 | 22 | a | SUS | × | C | 301 |
| 2 | 0 | 0.2 | 18 | b | Ti | Δ | D | 389 |
| 2 | 0.5 | 0.2 | 18 | b | Ti | □ | D | 605 |
| 2 | 0 | 0.1 | 18 | a | SUS | × | | 224 |
| 2 | 0 | 0.15 | 18 | a | SUS | Δ | | 321 |
| 2 | 0 | 0 | 16 | a | SUS | × | | 156 |
| 2 | 0 | 0.1 | 16 | a | SUS | × | | 178 |
| 2 | 0 | 0.15 | 16 | a | SUS | Δ | | 311 |
| 2 | 0 | 0.2 | 16 | a | SUS | Δ | | 455 |
| 2 | 0 | 0.3 | 16 | a | SUS | × | | 32 |
| 2 | 0 | 0 | 14 | a | SUS | × | | 147 |
| 2 | 0 | 0.1 | 14 | a | SUS | × | | 180 |
| 2 | 0 | 0.15 | 14 | a | SUS | Δ | | 316 |
| 2 | 0 | 0.2 | 14 | a | SUS | Δ | | 465 |
| 2 | 0 | 0.3 | 14 | a | SUS | × | | 29 |
| 2 | 0 | 0 | 12 | a | SUS | × | | 141 |
| 2 | 0 | 0.1 | 12 | a | SUS | × | | 176 |
| 2 | 0 | 0.15 | 12 | a | SUS | Δ | | 321 |
| 2 | 0 | 0.2 | 12 | a | SUS | Δ | | 446 |
| 2 | 0 | 0.3 | 12 | a | SUS | × | | 30 |

A: capability to set a scanning position closer to a butt interface
B: capability to reduce a heat input
C: capability to increase a size in workpiece
D: capability to increase types of usable metallic glasses
E: capability to increase types of usable crystalline metals
×: joint efficiency: less than 50%
Δ: joint efficiency: 50% to less than 100%
□: joint efficiency: 100% or more
○: joint efficiency: 100% or more, and no fracture in a bending test
* The joint efficiency means a ratio of a proof strength of a joined body to a lower one of proof strengths of two workpieces to be joined
a Zr41Be23Ti14Cu12Ni10 (at. %)
b Zr52Cu18Ni15Al10Ti5 (at. %)

The above examples evidently show the following additional advantageous effects.

The groove space is defined adjacent to an upper end of the butt interface, which makes it possible to prevent the crystalline metal from being melt-mixed in the weld metal. Thus, as seen in the examples using Ni and SUS, a composition of the weld metal can be controlled to fall within a composition range which is free of deterioration in glass-forming ability, and a joined body having sufficient joint strength can be obtained even if a beam scanning position is set closer to the butt interface. It has been verified that, even in a combination of a metallic glass and a crystalline metal which otherwise could not be joined together without setting a beam scanning position away from the butt interface, the groove space provided in the crystalline metal makes it possible to perform welding at a beam scanning position where no joining could be achieved without providing the groove space, so as to improve joint strength.

The groove space defined adjacent to the upper end of the butt interface makes it possible to allow energy for melting the crystalline metal to use for melting the metallic glass. Thus, a jointed body having sufficient joint strength can be obtained by melting only the metallic glass with less heat input (see, for example, the samples using Ti). It has been verified that the groove space provided in the crystalline metal makes it possible to obtain the same level of joint strength even if a heat input is reduced.

In an operation of welding a member having a relatively large thickness, it is necessary to increase a heat input to perform piercing welding. Consequently, a width of the melt zone is increased. In cases where the groove space is provided, the crystalline metal is largely melted to cause a significant change in composition of the weld metal. In contract, the groove space defined adjacent to the upper end of the butt interface and on the side of the crystalline metal makes it possible to suppress melting of the crystalline metal so as to maintain a composition of the weld metal in a composition range which is free of deterioration in glass-forming ability, to obtain a joined body having sufficient joint strength (see, for example, the samples using Ti). In cases where the groove space is not provided, sufficient joint strength could not be obtained when t=3 mm, although it could be obtained when t=2 mm. In contrast, it has been verified that the groove space provided in the crystalline metal makes it possible to obtain a joined body having excellent joint strength even when t=3 mm.

Even in an operation of welding a metallic glass having a relatively low glass-forming ability, the groove space defined adjacent to the upper end of the butt interface and on the side of the crystalline metal makes it possible to suppress melting of the crystalline metal so as to allow the welding to obtain a joined body having sufficient strength (see, for example, the samples using the metallic glass a).

Even if a certain amount of Zr or Ti as a component of the metallic glass is melt-mixed in the weld metal, a glass-forming ability will not deteriorate. However, if any component other than components of the metallic glass is melt-mixed in the weld metal from the crystalline metal, it has a great impact on a glass-forming ability. Thus, a joined body having sufficient strength cannot be obtained without minimizing the melt-mixing of such a component. Therefore, the groove space is defined adjacent to the upper end of the butt interface and on the side of the crystalline metal to suppress melting of the crystalline metal to reduce a change in composition of the weld metal. This makes it possible to obtain a joined body of a combination of a metallic glass and a crystalline metal which otherwise could not be joined together without providing the groove space (see, for example, the samples using the metallic glass a—SUS, Ni).

Figure 1:
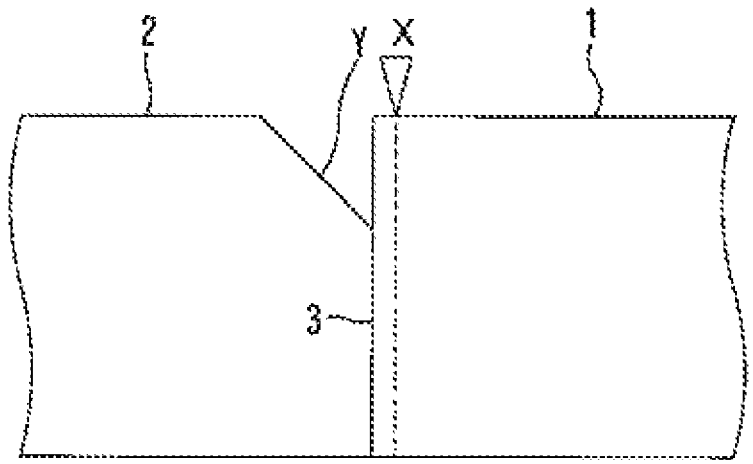
FIG. 1 is a schematic diagram for generally explaining a welding method of the present invention.
Figure 2:
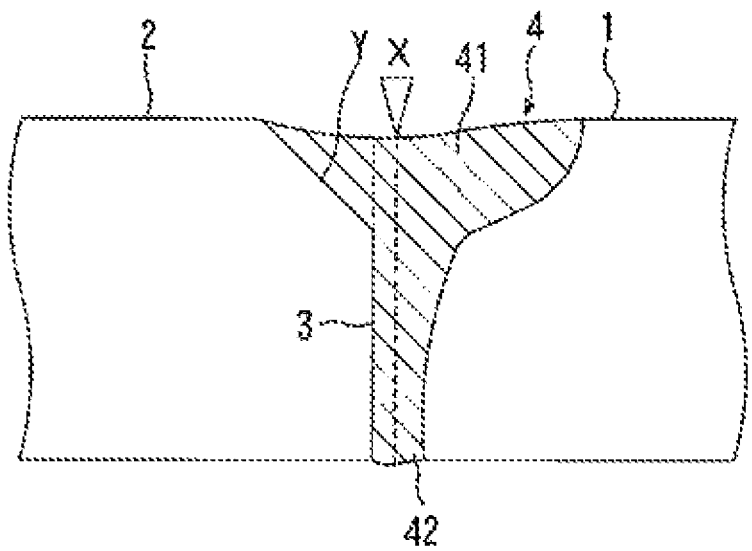
FIG. 2 is a schematic diagram showing a state after a metallic glass is melted and filled in a groove space, in the welding method of the present invention.
Figure 3:
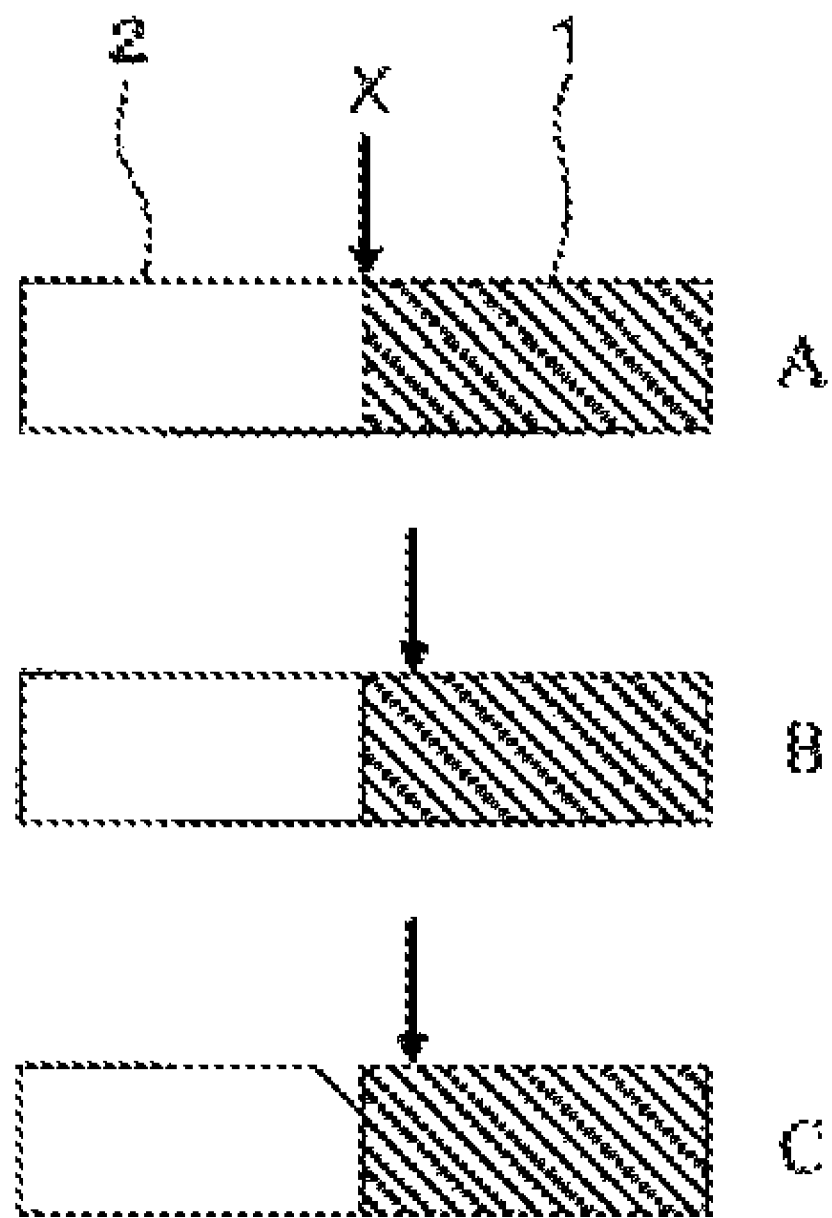
FIGS. 3A to 3C are schematic diagrams showing various beam irradiation modes.
Figure 4:
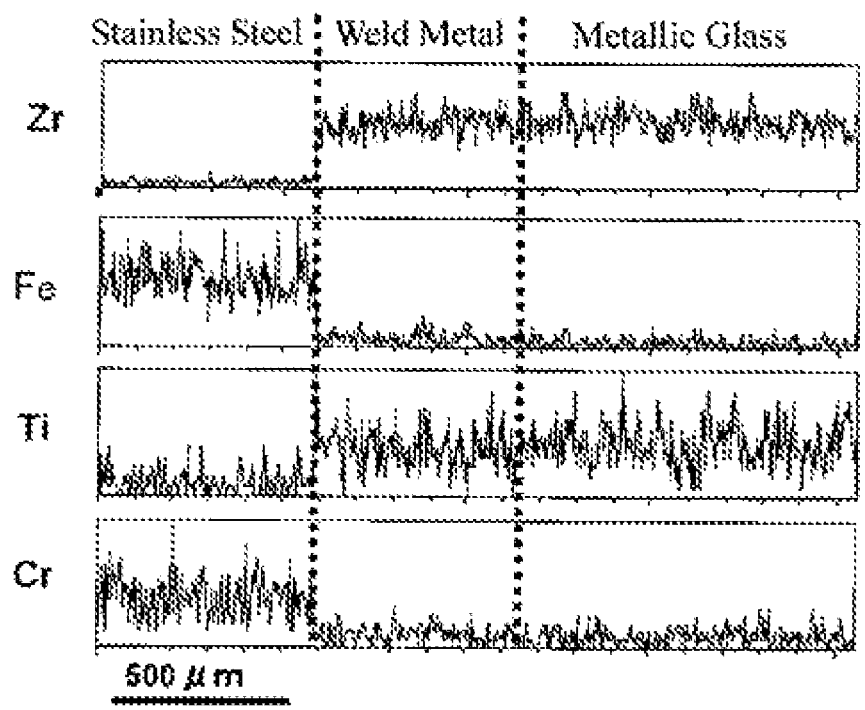
FIG. 4 is a chart showing that there is no change in composition of a weld metal in a welded region, in the welding method of the present invention.
Figure 5:
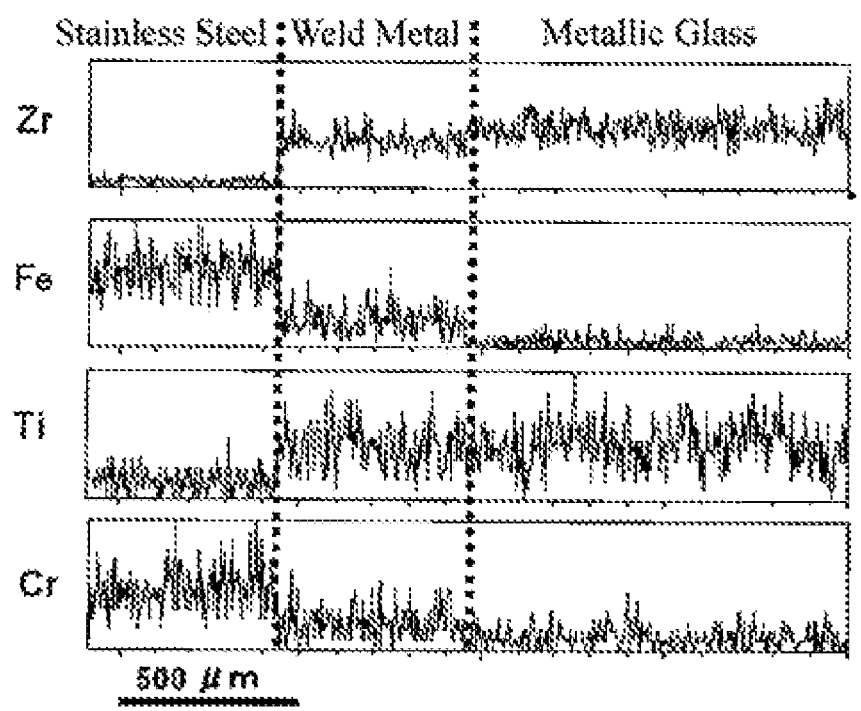
FIG. 5 is a chart showing that there is a change in composition of a weld metal in a welded region, in a conventional method.
Figure 6:
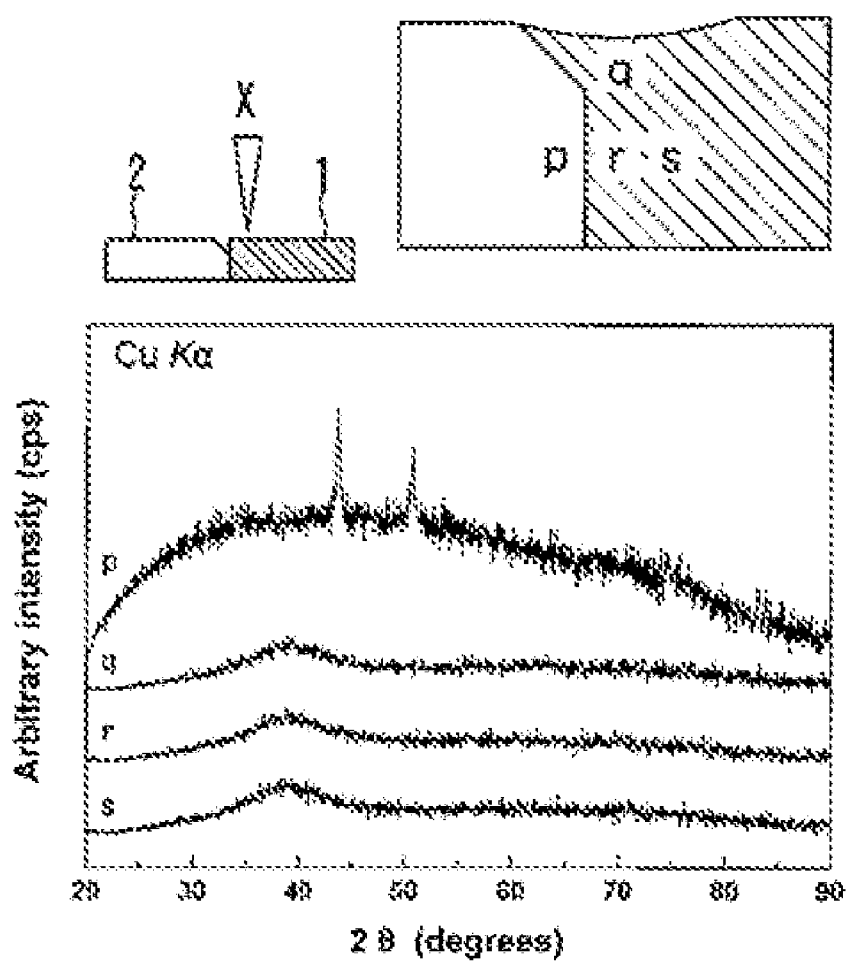
FIG. 6 is a diagram showing a result of micro area X-ray diffractometry for a joined body consisting of a metallic glass and a stainless steel, in the welding method of the present invention.
Figure 7:
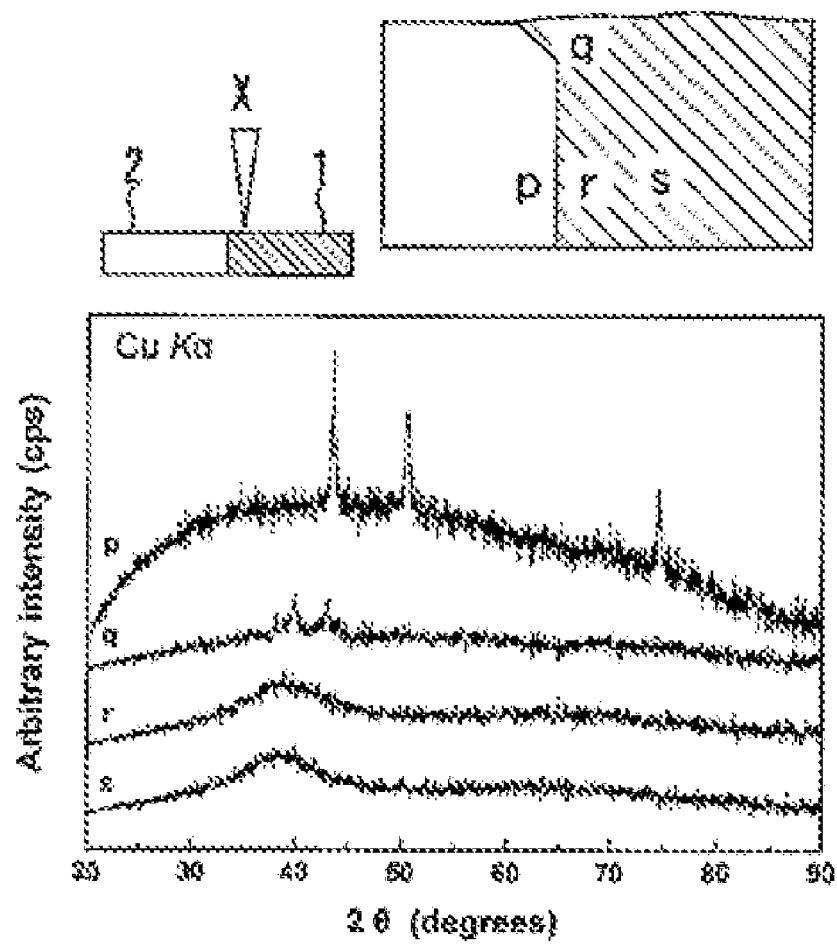
FIG. 7 is a diagram showing a result of micro area X-ray diffractometry for a joined body consisting of a metallic glass and a stainless steel, in the conventional method.
Figure 8:
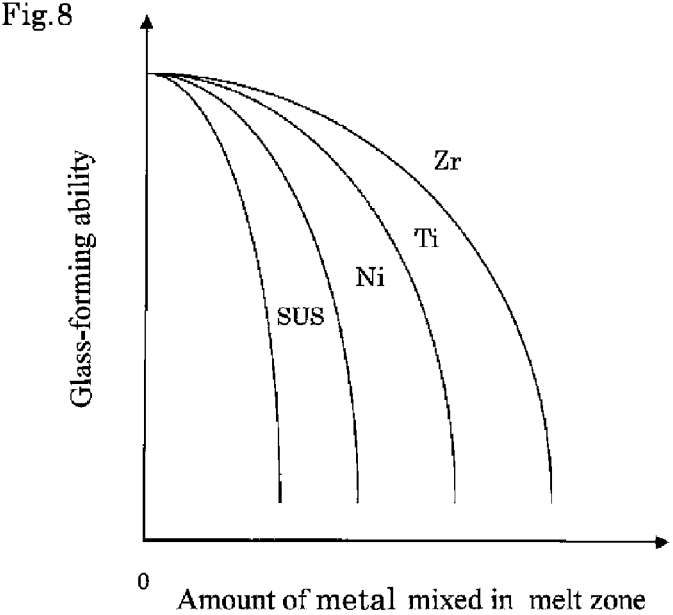
FIG. 8 is a graph conceptually showing a change in glass-forming ability of a melt zone when each of various crystalline metals is melt-mixed in a Zr-based metallic glass.
Figure 9:
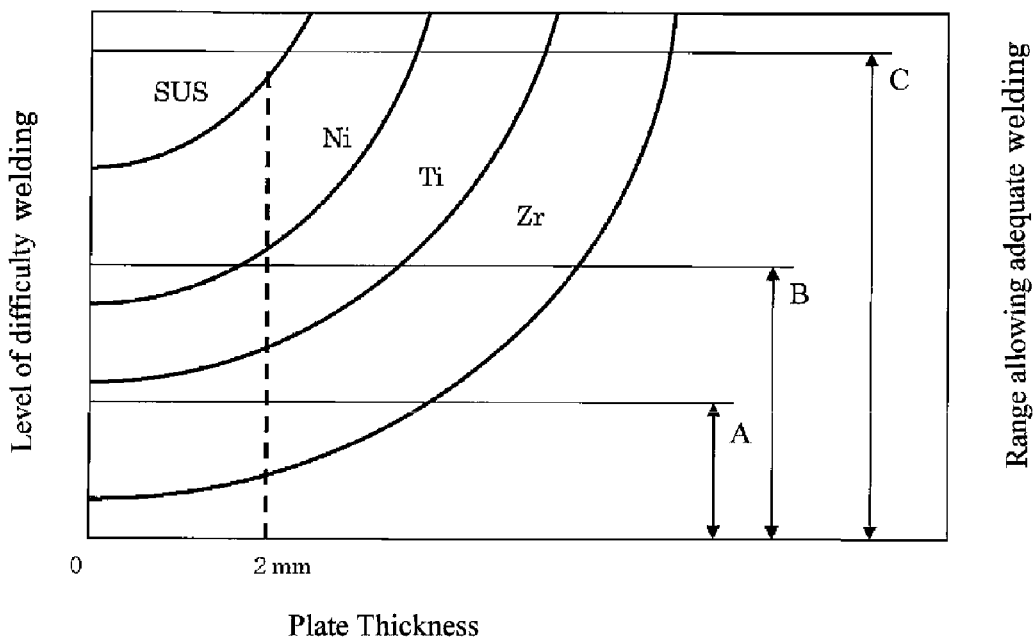
FIG. 9 is a graph conceptually showing a relationship between a level of difficulty in welding, and a range allowing adequate welding by each of various welding methods, when each of the various crystalline metals is melt-mixed in the Zr-based metallic glass in a certain amount.

| EXPLANATION OF CODES | |
|---|---|
| 1: | metallic glass |
| 2: | crystalline metal |
| 3: | butt interface |
| 4: | melt zone |
| 41: | top fused sub-region |
| 42: | lower fused sub-region |
| X: | high-energy beam |
| Y: | groove space-defining line |

TABLE 1 and TABLE 2 are attached here.

The invention claimed is:

1. A welding method, comprising:
   welding a metallic glass and a crystalline metal together at a butt interface by scanning a high-energy beam in a weld position shifted away from the butt interface in a direction toward the metallic glass,
   wherein a groove is formed in the crystalline metal extending from within the butt interface to an upper surface of the crystalline metal away from the butt interface thereby defining a groove space adjacent to the butt interface on the side of the crystalline metal.

2. The welding method as defined in claim 1, wherein the groove space is located within a melt zone of the metallic glass and the crystalline metal, and set based on a melting isotherm of the crystalline metal.

3. The welding method as defined in claim 1 or 2, wherein a metallic glass having a same composition as that of the butted metallic glass is supplied into the space over the groove during irradiation with the high-energy beam.

4. The welding method as defined in claim 1, wherein the metallic glass and the crystalline metal butted against each other are inclined to allow the metallic glass to be elevated above the crystalline metal.

5. The welding method as defined in claim 1, wherein the groove is substantially linear.

6. The welding method as defined in claim 1, wherein the high-energy beam is an electron beam or a laser beam.

7. A welding method for weldingly joining a metallic glass and a crystalline metal together, at a butt interface formed between the metallic glass and the crystalline metal, by scanning a high-energy beam at a weld position substantially shifted toward the metallic glass, while butting the metallic glass and the crystalline metal against each other,
   wherein the metallic glass and the crystalline metal butted against each other are inclined together at an angle of 5 degrees or more to allow the metallic glass to be elevated above the crystalline metal thereby suppressing the mixing of molten crystalline metal with the metallic glass within the butt interface.

8. The welding method as defined in claim 7, wherein a groove is formed in the crystalline metal between the butt interface and an upper surface of the crystalline metal, thereby defining an absence of crystalline metal within the butt interface.

9. The welding method as defined in claim 8, wherein the groove is substantially linear.

10. The welding method as defined in claim 7, wherein the high energy beam is an electron beam or a laser beam.

11. A welding method comprising:
   abutting an end of a metal glass and an end of a crystalline metal together, the abutted ends of the metal glass and crystalline metal defining a butt interface, the abutted metal glass and the abutted crystalline metal having corresponding upper and lower surfaces, the crystalline metal having a groove formed from the butt interface to an upper surface of the crystalline metal thereby defining a groove space in the crystalline metal adjacent the butt interface; and scanning a high-energy beam in a beam weld position shifted from the butt interface toward the metal glass thereby forming a melt zone along the butt interface, the melt zone including an upper fused sub region proximate the upper surfaces and a lower fused sub region proximate the lower surfaces, the upper fused sub region of the melt zone extending into the groove space.

12. The welding method as defined in claim 11, wherein the pressed metallic glass and the pressed crystalline metal are inclined at an angle of 5 degrees or more to allow the metallic glass to be elevated above the crystalline metal.

13. The welding method as defined in claim 11, wherein the metallic glass is Zr-based.

14. The welding method as defined in claim 11, wherein the crystalline metal includes at least one of Zr, Ti, Ni, and SUS 316L.

15. The welding method as defined in claim 11, wherein the scanning forms a depression between the upper surfaces of the metal glass and the crystalline metal.

16. The welding method as defined in claim 15, further comprising supplying an additional metallic glass at least partially within the groove space and scanning the additional the metallic glass with the high-energy beam thereby melting the additional metallic glass to reduce or eliminate the formed depression.

17. The welding method as defined in claim 11, further comprising a preheating operation.

18. The welding method as defined in claim 11, wherein the crystalline metal is made of either Ni or SUS, stainless steel type 316L.

19. The welding method as defined in claim 11, wherein the high energy beam is an electron beam or a laser beam.

* * * * *

UNITED STATES PATENT AND TRADEMARK OFFICE
CERTIFICATE OF CORRECTION

PATENT NO. : 8,404,992 B2
APPLICATION NO. : 12/670125
DATED : March 26, 2013
INVENTOR(S) : Kawamura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 529 days.

Signed and Sealed this
First Day of September, 2015

Michelle K. Lee
*Director of the United States Patent and Trademark Office*